June 16, 1964
M. E. REMLEY
3,137,024
LIQUID APPLICATOR
Filed Jan. 27, 1958
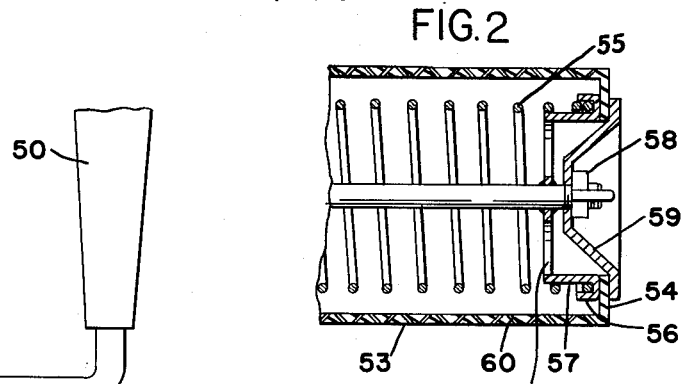
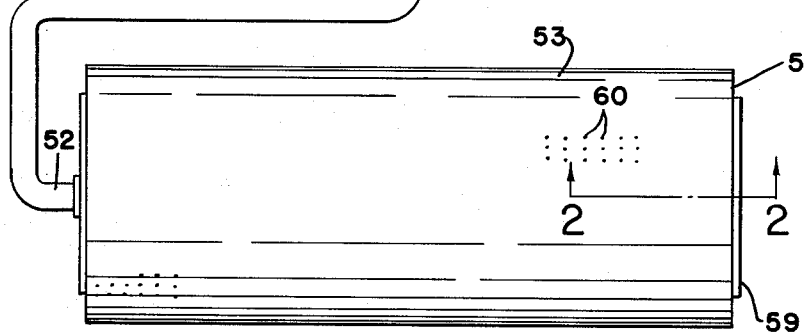
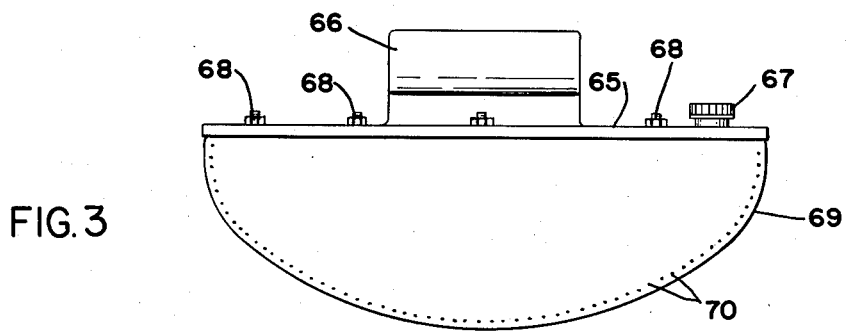
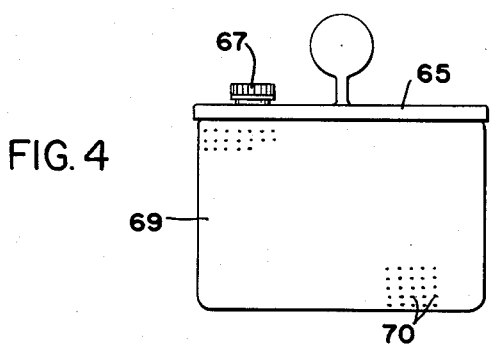
INVENTOR
MARY E. REMLEY
BY
*Fay & Fay*
ATTORNEYS ়
3,137,024
LIQUID APPLICATOR
Mary E. Remley, 914 S. Fairfax St., Alexandria, Va.;
Roland E. Remley, Jr., executor of said Mary E. Remley, deceased, assignor to himself
Filed Jan. 27, 1958, Ser. No. 711,285
1 Claim. (Cl. 15—562)

This application, relating as indicated to a liquid applicator with self-sealing apertures, is particularly directed to an impervious container or elastomer bag which contains a fluid with means to apply a pressure to the fluid by hand, and including a multiplicity of self-sealing apertures having openings through the elastomer bag that are angled or curved with respect to the bag and the nearest passageway therethrough.

This device has particular application for distribution of cleaning fluids in washing, for painting, and the like where it is needed to apply a liquid possibly containing a certain amount of solid particles to a surface, which surface is either flat or round.

This invention has particular application in connection with distributing a liquid, together with a means for providing a self-sealing aperture in a rubber or elastomerlike bag. In general, apertures in rubber will leak after a period of time, particularly with a hydrostatic head within the bag.

This application provides for apertures having an angled or curved path that is somewhat longer than the thickness of the rubber or elastomeric type material walls, with a head of fluid to close off and seal an aperture. This explanation may be the precise explanation for the existence of this new result, but other explanations also may be provided for the operational characteristics of this liquid applicator.

An object of this invention is to provide a new and improved applicator with self-sealing apertures and means for distributing a liquid over an area.

A further object of this invention is to provide a new means for distributing fluid to a surface, either in a controlled or continuous pattern, said fluid being ink, cleaning fluid, paint, and the like.

To the accomplishment of the foregoing and related ends, said invention then consists of the means hereinafter fully described and particularly pointed out in the claim; the following description setting forth in detail one approved means of carrying out the invention, such disclosed means, however, constituting but one of the various ways in which the principles of the invention may be used.

FIG. 1 is a fragmentary plan view of a roller applicator;
FIG. 2 is a cross-sectional view along the line 2—2 of FIG. 1;
FIG. 3 is a side view of a non-elected modification of the invention;
FIG. 4 is an end view of the non-elected modification shown in FIG. 3.

FIGS. 1 and 2 show a roller applicator having the conventional handle 50, the connecting J-shaped bar 51, one portion of which serves as the axle as at 52. The outside would be a cylindrical covering of a resilient elastomer or rubber 53, having an end flanged portion 54. Within the container would be a spring element 55 adapted to support the carriage. This would be spaced from the wall of the elastomer liner and would be carried by an annular portion 56 which terminates in a cylindrical flanged section 57 and holds the spring. A nut fastening means shown at 58 holds to the bearing 52 and holds an end plate member 59 to make a tight connection with the elastomer bag. Self-sealing angulated apertures are shown at 60 to permit the fluid to pass therethrough. Pressure on the roller will be transmitted by means of the axle to the resilient spring 55 but since the bag extends outwardly therefrom, pressure would be put upon the bag to cause the fluid to pass therethrough. Suitable openings would be provided in the annular member 56 to permit the fluid to pass into the chamber. These openings are shown at 61. Other types of end caps or fillers may be used in this combination. The opposite end of the roller would be solid and attached to a leak-tight bearing.

In connection with this device, a partition diametrically across the container may be useful particularly in overhead application. This divides the chamber into two semi-cylindrical surfaces which may be filled in the same manner through a multiplicity of openings 61 in the end flanged portion 54. Such a portion in the container permits pressure to be applied to that part of the container in contact with the ceiling or other surface without a corresponding back pressure on the opposite surface of the chamber.

FIGS. 3 and 4 show a non-elected modified version of the invention with a pressure plate indicated at 65, a handle member 66, a filler cap 67, and suitable fastening means shown generally at 68 to secure the elastomer bag 69. The bag has the conventional self-sealing apertures previously described, which are shown at 70. This applicator would be particularly useful for long periods of time, i.e., the fluid stored in the container until almost all of it is used up. The applicator would be particularly good for use in connection with rougher surfaces, such as in painting and when using cleaning fluids.

This application is a continuation-in-part of my application Serial No. 580,795, filed April 26, 1956, now abandoned.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claim.

The invention claimed is:

A liquid dispensing applicator comprising in combination
 a generally J-shaped bar having handle means on a portion thereof with the remaining portion forming an axle,
 a generally cylindrical resilient elastomeric member having inwardly projecting flanges at opposite ends thereof disposed around said axle,
 a pair of end plates rotatably disposed on said axle and being in fluid tight engagement with the exterior flange portions of said elastomeric member,
 spring means disposed within said elastomeric member having opposite ends thereof received in flanged portions of a pair of annular plate members,
 said spring means forcing said annular plate members into engagement with said flanges fluid tight to grip said elastomeric member between said end plates and said annular plates,
 a plurality of self-sealing apertures disposed in a generally saw-tooth pattern as viewed in cross section in rows longitudinally across said elastomeric member evenly to meter fluid therethrough when external pressure is applied to said elastomeric member,
 said apertures being self closing under hydrostatic pressure and further wherein said spring means and said annular and end plates are of lesser diameter than said cylindrical elastomeric member to allow flexing thereof to open said apertures.

References Cited in the file of this patent

UNITED STATES PATENTS

| | | |
|---|---|---|
| 403,566 | Underwood | May 21, 1889 |
| 489,697 | Taylor | Jan. 10, 1893 |
| 1,264,666 | Ljungstrom | Apr. 30, 1918 |
| 1,989,201 | Kurtz | Jan. 29, 1935 |
| 2,083,551 | Balinger | June 15, 1937 |
| 2,234,558 | Huston | Mar. 11, 1941 |
| 2,627,620 | Gudze | Feb. 10, 1953 |

FOREIGN PATENTS

| | | |
|---|---|---|
| 1,013,567 | France | Apr. 30, 1952 |
| 1,104,638 | France | June 15, 1955 |